United States Patent [19]

Shaw

[11] Patent Number: 5,065,527

[45] Date of Patent: Nov. 19, 1991

[54] LENGTH MEASURING AND POSITIVE DRIVE APPARATUS

[76] Inventor: Howard C. Shaw, 700 Wyndwicke Rd., St. Joseph, Mich. 49085

[21] Appl. No.: 669,984

[22] Filed: Mar. 15, 1990

[51] Int. Cl.$^5$ .......................... G01B 3/12; G01B 5/04
[52] U.S. Cl. ...................................... 33/734; 33/737; 33/744; 33/747; 33/776
[58] Field of Search ................ 33/734, 735, 737, 743, 33/744, 747, 748, 749, 776

[56] References Cited

U.S. PATENT DOCUMENTS

| 2,707,332 | 5/1955 | Smith | 33/748 |
|---|---|---|---|
| 2,876,549 | 3/1959 | Adamson et al. | 33/734 |
| 3,308,544 | 3/1967 | White | 33/744 |
| 3,579,842 | 5/1971 | Scher et al. | 33/744 |
| 3,828,437 | 8/1974 | Heselwood | 33/744 |
| 4,195,410 | 4/1980 | Strohmeyer | 33/744 |
| 4,570,348 | 2/1986 | Amsler et al. | 33/734 |
| 4,798,003 | 1/1989 | Haglöf | 33/734 |

FOREIGN PATENT DOCUMENTS 0635197  4/1950  United Kingdom ................. 33/744

*Primary Examiner*—William A. Cuchlinski, Jr.
*Assistant Examiner*—Christopher W. Fulton
*Attorney, Agent, or Firm*—Leo H. McCormick, Jr.

[57] ABSTRACT

A mechanism for accurately measuring the length of a continuously produced product, i.e. cable, hose, chord, tube, rope, strip, wire, fiber and etc. The mechanism has a housing for retaining first and second shafts. A first rotatable member attached to the first shaft has a first circumferential face with a pliable surface thereon. A second rotatable member attached to the second shaft has a second circumferential face with a pliable surface thereon. The first and second rotatable members are moved toward each other to define a common chord between the first and second circumferential faces. The pliable surface of the circumferential faces surrounds the product as the product moves along the entire chord. An encoder responsive to rotation of the second shaft generates discrete signals which are communicated to a counter to indicate the distance moved by the product along the chord. The counter has a visual readout to inform an operator of the length of product that has passed through the mechanism. After one or more preset lenghts or counts of the product has been measured, the counter may activate another device in the system such as a cut-off device to sever the product or a marker which places a permanent marks on the product to indicate linear distances between points on the product.

20 Claims, 3 Drawing Sheets

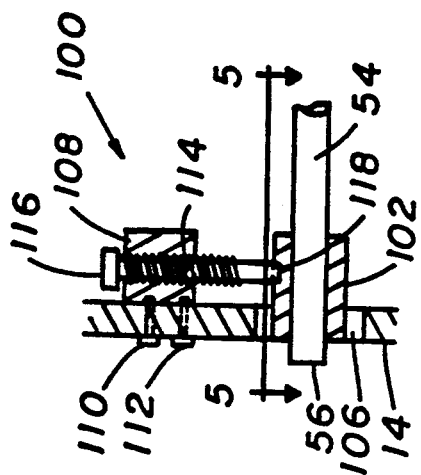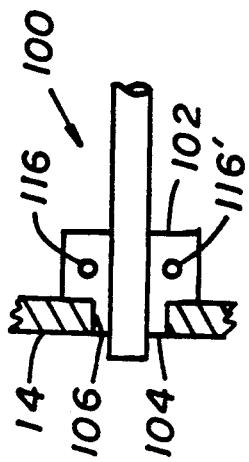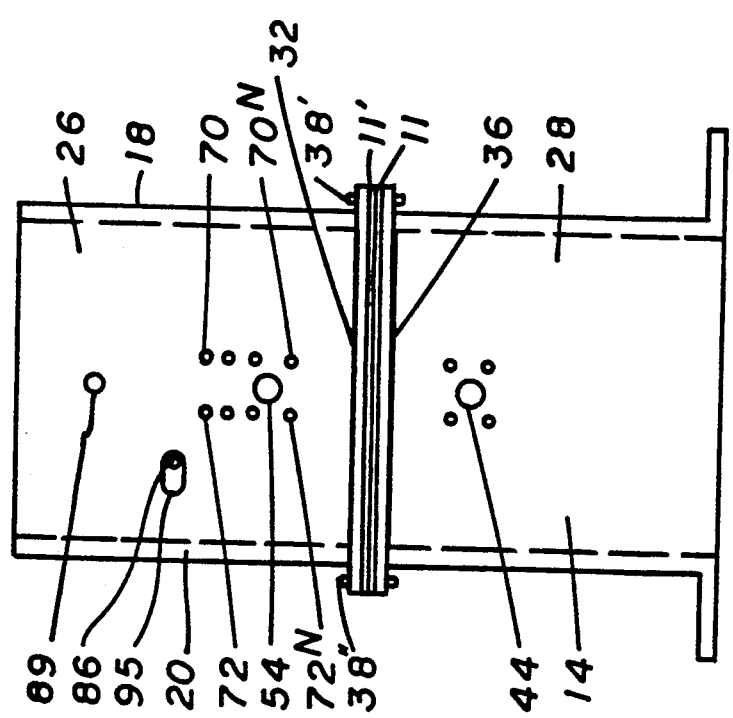

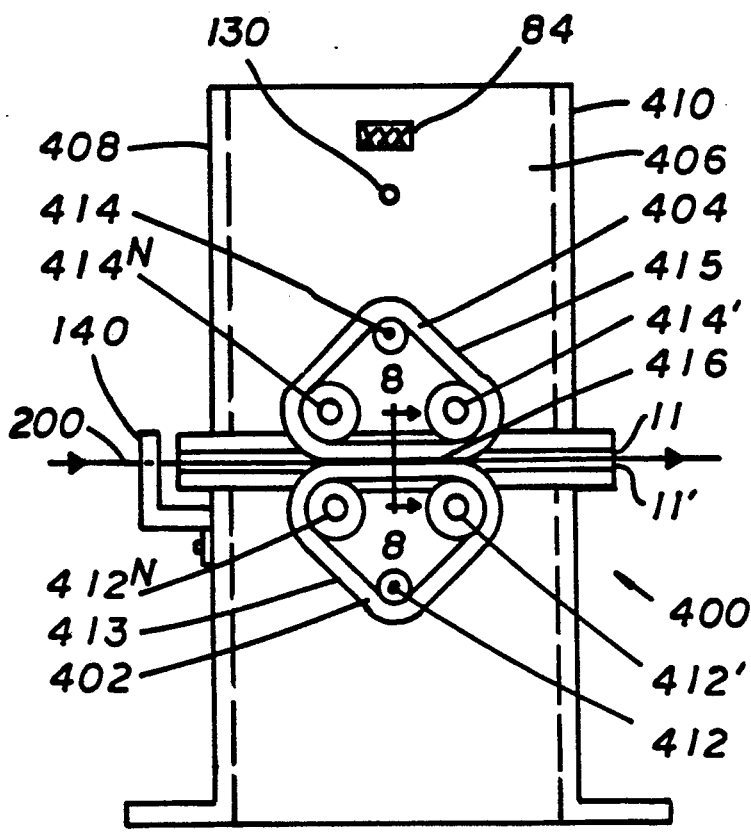
FIG. 7
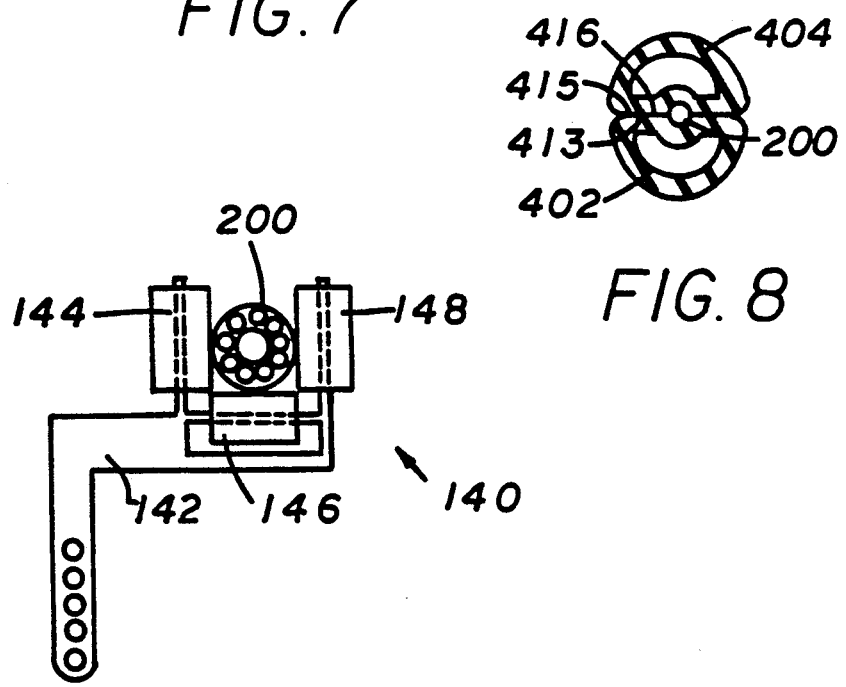
FIG. 8
FIG. 6

LENGTH MEASURING AND POSITIVE DRIVE APPARATUS

This invention relates to a mechanism for accurately measuring a length of continuously produced products such as chords, cables, strands of wire, fibers, hoses, ribbons, strips, rope and etc. The mechanism has a housing which retains first and second rotatable members. The rotatable members have fixed circumferences which are moved into engagement with each other to establish a common chord therebetween. The continuously produced product is aligned in a plane with the chord and pliable surfaces on the first and second circumferences of the first and second rotatable members. The pliable surfaces substantially surround and engage the product as the product moves along the entire chord. An encoder is connected to one of the rotatable members to provide a counter with signals corresponding to discrete signals of the linear movement of the product along the chord to visually display of the measured length of the product. After a predetermined length of product has passed along the chord, the counter provides a signal to a cut-off device or marker to act on the product.

In the past many products such as cables, rope, wire thread, fibers, chords and other continuously produced products have often been sold by weight. The length of a product purchased being a function of the total weight divided by the theoretical weight per linear foot of the product. Since many factors enter into the weight, at times the actual length of the product may not be of a desired accuracy.

A more accurate method of measuring the length of a product is shown in U.S. Pat. Nos. 1,340,218; 1,624,633; and 2,074,524 wherein a counter device is held in tangential engagement with a product whose length is to be determined. This method of measuring length is adequate for many applications, however, under some circumstances slippage may occur between the product and counter which can result in an inaccurate measurement of length. Slippage occurs as a result of the point contact between a cylinder and a curved surface or line contact between elements riding on a belt with a curved surface. Frictional engagement can be increased through the use of springs which act on and hold the product against the counter. Structure to increase the friction between a product and counter is disclosed in U.S. Pat. Nos. 1,490,974; 1,679,899; 1,908,382; 3,528,177; and 3,838,519 wherein the product is resiliently held between rollers to reduce slippage.

More recently laser measuring devices such as disclosed in U.S. Pat. No. 4,792,695 have been developed for use in some manufacturing applications. Unfortunately, if dust is produced during such manufacture, the dust needs to be continually removed from sensors to assure that accurate measurements are obtained. Further, the cost of such laser measuring devices is not justified for most applications.

Recently, the size of cables for transmission of signals have been reduced through the use of glass fibers. Transmission clarity is dependent on the accurate location of intensifiers. Thus it is important to know the exact length of a cable between two points. Unfortunately, the actual size of fiber glass cables have rendered tangential measuring devices, which are subject to slippage, ineffective to accurately measure the length of such cables.

I have developed a length measuring and positive drive apparatus which accurately measures the length of a fiber optic cable or any other product by extending a contact zone with a counter device from tangential engagement to engagement along a chord. In my measuring apparatus, a pair of rotatable members having pliable surfaces on fixed circumferential faces are positioned with respect to each other to establish a common chord therebetween. The length of a product to be measured is aligned in a plane and centered with respect to the chord. The pliable surfaces substantially surround the product along the entire chord as the product moves along the chord. An encoder responsive to rotation of one of the rotatable members provides a counter with discrete signals corresponding to the linear movement of the product along the chord. Since the pliable surfaces engage the product along the entire chord, slippage is substantially eliminated and an accurate measurement of the length of the product is obtained as the product is manufactured. The counter is connected to the encoder and is designed to trigger a marker which places a mark on the product at discrete intervals to provide an accurate indication of length between points on the product or to activate a cut-off device which severs the product after a predetermined length of product has passed along the chord.

It is an object of this invention to provide a system for accurately measuring the length of a continuously produced product.

It is a further object of this invention to provide a means for measuring the length of a cable as the cable moves on a common chord formed between first and second rotatable members. Pliable surfaces on the circumferential faces of the first and second rotatable members engage the cable to prevent slippage as the cable moves along the chord. An encoder responsive to rotation of the rotatable members provides a counter with signals to indicate the length of the cable as it moves along the chord.

An advantage of this invention resides in the use of rotatable members having pliable surfaces which are moved together to establish a common chord. A product whose length is to be measured is aligned in a plane and centered with the chord. An encoder transmits signals of discrete movement of the cable on the chord to define a linear readout of the length of the cable.

These objects and advantages should be apparent from reading this specification while viewing the drawings wherein:

FIG. 3 is a view taken along line 3—3 of FIG. 2;

FIG. 4 is an adjustment device for moving a second shaft toward a first shaft to establish a chord between the first and second rotatable member;

FIG. 5 is a sectional view taken along line 5—5 of FIG. 4;

FIG. 6 is a schematic illustration of a guide for centering a cable in a plane in alignment with a common chord created between rotatable members;

FIG. 7 is schematic illustration of a second embodiment of the measuring apparatus wherein a cable is moved along a common plane formed between first and second moveable belts to accurately measure the length of the product; and FIG. 8 is a sectional view taken along line 7—7 of FIG. 7 showing the common plane formed between the moveable belts.

Figures 1, 2:
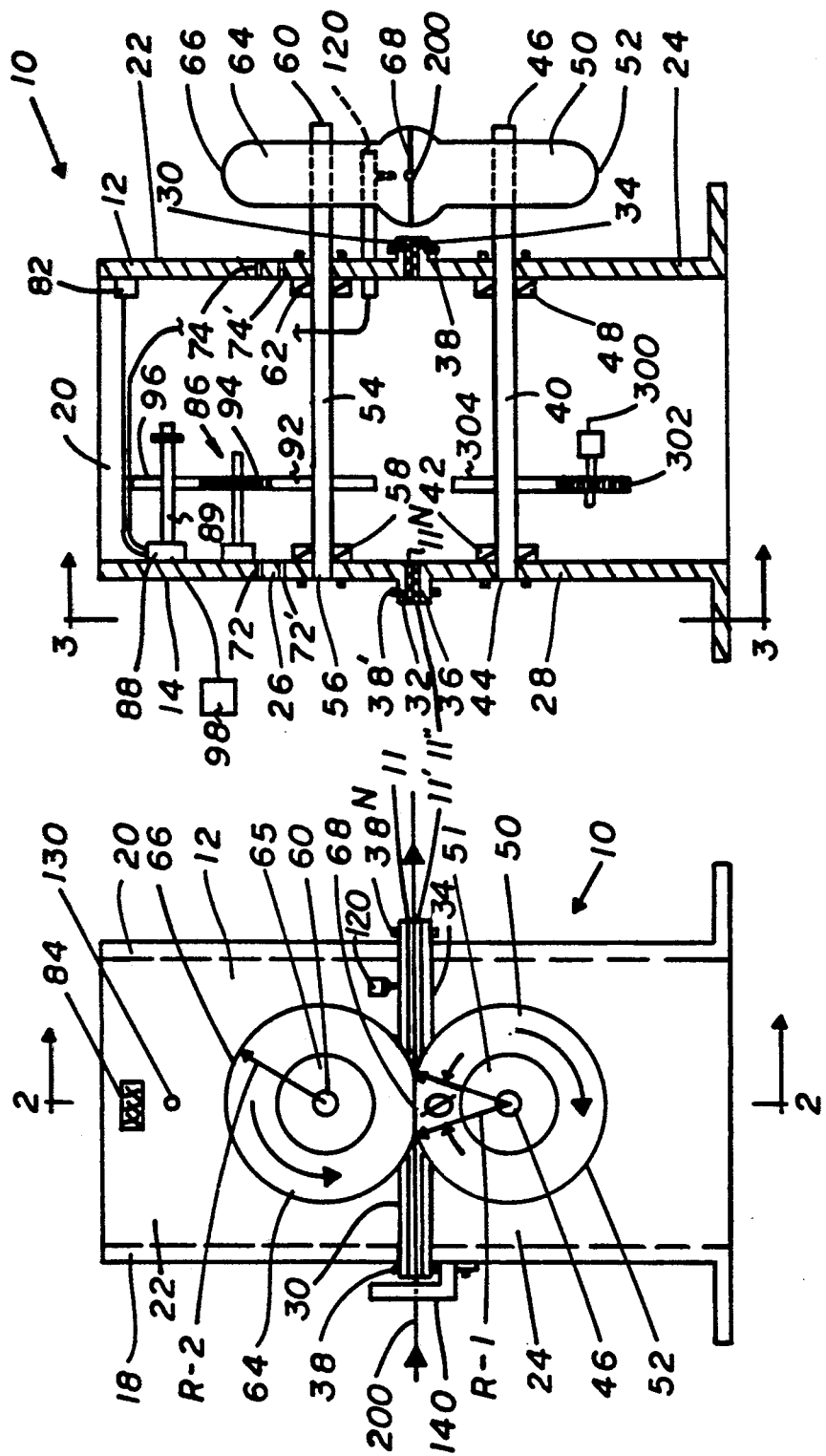
FIG. 1 is a schematic illustration of a measuring apparatus made according to the principals of this invention.
FIG. 2 is a sectional view taken along line 2—2 of FIG. 1.

The length measuring and positive drive device 10 shown in FIGS. 1 and 2 has a housing made up of side walls 12 and 14 which are connected to end walls 18 and 20 to form a unitary structure. Side wall 12 is made up of a top half 22 and a bottom half 24 while side wall 14 is made up of a top half 26 and a bottom half 28. Top halves 22 and 26 have flanges 30 and 32 while bottom halves 24 and 28 have flanges 34 and 36 which are joined together by a plurality of bolts 38, 38' ... 38$^n$. In some instances, it may be desirable to have a plurality of spacers 11,11' ... 11$^n$ located between the flanges 30, 32 and 34, 36 to provide an opportunity of changing the distance between a first shaft 40 and a second shaft 54.

Shaft 40 has a first end 44 attached to a mounting-bearing means 42 which is secured to side wall 14 and a second end 46 that extends through side wall 12. A second mounting-bearing means 48 attached to side wall 12 secures shaft 40 to the housing of the measuring device 10.

A first rotatable member 50 has a hub 51 which is attached to the second end 46 of shaft 40. Rotatable member 50 has a radius R-1 and a fixed circumference on face 52. Face 52 has a pliable surface and in the embodiment shown in FIGS. 1 and 2, rotatable member 50 is a rubber tire mounted on a rim attached to hub 51. The tire has an inflatable tube which aids in the establishment of a chord 68, as later described herein.

Shaft 54 has a first end 56 attached to a mounting-bearing means 58 secured to side wall 14 and a second end 60 that extends through side wall 12. A second mounting-bearing means 62 attached to side wall 12 secures shaft 54 to the housing of the measuring device 10.

A second rotatable member 64 has a hub 65 which is attached to the second end 60 of shaft 54. Rotatable member 64 has a radius R-2 and a fixed circumference on face 66. Face 66 has a pliable surface and in the embodiment shown in FIGS. 1 and 2, rotatable member 64 is a rubber tire mounted on a rim attached to hub 65. The rubber tire has an inflatable tube which aids in the establishment of chord 68, as later described herein.

Initially circumferential faces 52 and 66 on rotatable members 50 and 64 engage each other at a point or tangent. However, when bolts 38,38' ... 38$^n$ are tightened to bring flanges 30, 34 and 32, 36 together, shafts 40 and 54 are moved toward each other and a common chord 68 is formed between the rotatable members 50 and 64. The length of the common chord 68 is directly dependent on the space relationship between shafts 40 and 54. Although the length of chord 68 is fixed after bolts 38,38' ... 38$^n$ are tightened, the gripping force of the pliable surfaces can be effected by increasing or decreasing the air pressure in the tubes of the tires.

Another way that the distance between shafts 40 and 54 can be changed is by selectively choosing a different mounting location on wall 14 for the mounting-bearing means 58 from the plurality of openings 70, 70' ... 70$^n$ and 72, 72' ... 72$^n$ as shown in FIG. 3 and on wall 12 for the mounting-bearing means 62 from a plurality of corresponding opening 74, 74' ... 74$^n$, as shown in FIG. 2.

A still further way of changing the distance between shafts 40 and 54 and correspondingly the length of the chord 68 is shown in FIGS. 4 and 5. Mounting-bearing means 100 for locating shaft 54 in walls 14 and 12 are identical, adjustable and only illustrated with wall 14.

Mounting-bearing means 100 has a first housing 102 for retaining end 56 of shaft 54 in wall 14. First housing 102 has a projection 104 which is located in slot 106 in wall 14. A second housing 108 is fixed to wall 14 by a plurality of bolts 110, 112. The second housing 108 has parallel threaded sections 114 that extends therethrough, only one of which is shown in FIG. 4. Drive screws 116, 116', each have a head on one end and a second end 118, only one of which is shown, that are attached to the first housing 102. When a change in the length of the chord 68 is desired, the heads on drive screws 116, 116' are rotated causing the first housing 102 to move in slot 106 and change the position of shaft 54 with respect to shaft 40.

A counter display device 82 mounted on wall 12 receives an input from an encoder 88 mounted on wall 14. The counter display device 82 is responsive to signals from encoder 88 corresponding to discrete intervals of rotation of shaft 54. The encoder 88 as shown in FIG. 2 is driven by a chain or belt which is located on a plurality of sprockets 92, 94 and 96 which modify and transmit rotational movement of shaft 54 to shaft 89 associated with encoder 88. In the preferred embodiment, shaft 86 is fixed on wall 14 and links can be removed from or added to the chain or belt which surrounds the sprockets 92, 94, and 96 should their be a change in the distance between the shafts 54 and 40.

Another way of maintaining proper linkage between shaft 54 and shaft 89 is shown in FIG. 3, wherein shaft 86 for gear 94 is be moved in slot 95 in wall 14 to maintain engagement with gear 92 when the distance between shafts 54 and 40 is changed.

The change in distance being required for the linkage between the shaft 54 and shaft 89 whenever additional spacers 11, 11' ... 11$^n$ are used; different mounting openings 70, 70' ... 70$^n$; 72, 72' ... 72$^n$ and 74, 74' ... 74$^n$ as shown in FIG. 3 are selected; or the adjustment device 100 shown in FIG. 4 is used to assure that rotation of shaft 54 is accurately transmitted to shaft 89.

While any modification of the rotation of shaft 54 could be selected, sprockets 92, 94 and 96 provide an 8 for 1 multiplication of the rotation of shaft 54 to encoder 88. Counder display device 82 reacts to the discrete signals and converts the same into a digital electrical signals that are simultaneously displayed on face 84. If necessary, encoder 88 may respond to and provide a remote control device 98 with information relating to the length of the cable 200 as it travels along chord 68. Counter display device 82 may also be connected to provide a marker or cut-off device 120 mounted on wall 12 with a signal to perform an additional function on the cable 200.

When mechanism 120 is a marker, a container with a supply of dye is located on wall 12. A solenoid valve located in the container is activated at discrete intervals by an input signal from counter display device 82. The solenoid valve responds to the signals and the dye coats the surface of the cable 200 to provide a visual indication of the measured length between distinct points on the cable 200.

When mechanism 120 is a cut-off device, a solenoid responds to a signal from the counter display device 82 to sever the cable 200 after a predetermined measured length of cable 200 has passed along the chord 68.

An indicator light 130 located on wall 12 informs an operator when power is supplied to the readout device 82 and the length measuring and positive drive apparatus 10 is activated.

A guide 140 attached to wall 18 has an opening which aligns the cable 200 in a horizontal plane with the chord 68 and in the center of the rotatable members 50 and 64. Guide 140 as shown in FIG. 6 has a base 142 which is adjustable on wall 18 and a plurality of rollers 144, 146 and 148 to prevent damage of the cable 200 on movement along chord 68.

In operation, cable 200 is aligned by guide 140 in the center of rotatable members 50 and 64 on chord 68. The pliable surfaces on the rotatable members 50 and 64 substantially surround the cable 200 as the cable moves along the chord 68. Rotation of shaft 54 is transmitted through encoder 88 to counter display device 82 which displays on face 84 a digital indication of the length of cable 200 as it moves along chord 68.

In some operations, it may be necessary to provide some assistance in overcoming the friction or drag that is introduced into the measuring device 10 by the pliable surfaces on the circumferential faces 52 and 66 of the rotatable members 50 and 64. An electric motor 300 is connected to the power source associated with the indicator light 130. Electric motor 300 drives shaft 40 through gears 302 and 304 to impart rotational torque to rotatable member 50. Engagement of pliable surface on rotatable member 50 with pliable surface on rotatable member 64 along the chord 68 rotates shaft 54.

Under some circumstances, electric motor 300 may also be called upon to provide sufficient torque to push or pull the cable 200 through the measuring device 10 at a predetermined speed in synchronization with another component in a supply line such as an extruder machine.

In a plurality of tests used to evaluate the length measuring and positive drive apparatus device 10, a cable 200 having a insulated surface with nominal diameter of 3/16 inches and wherein the chord 68 had a length of 4 inches, the measured length of 100 feet of cable 200 by the length measuring and positive drive apparatus 10 was within 0.06 inches.

In some instances it may be desirable to increase the length of the chord 68 greater than is feasible with rotatable members 50 and 64. In order to increase the chord length, rotatable members 50 and 64 were replaced with belt means 402 and 404 to form measuring device 400 shown in FIG. 7 and 8. Only those components of length measuring and positive drive apparatus 400 that are different than length measuring and positive drive device 10 are hereinafter described in detail.

Length measuring and positive drive apparatus 400 has a housing with a first wall 406 separated from a second wall, not shown, by side walls 408 and 410. A first plurality of parallel shafts 412, 412' . . . 412$^n$ are retain by the first and second walls. The first belt 402 is located on hubs attached to the first plurality of shafts 412, 412' . . . 412$^n$. The first belt 402 has a fixed circumference 413 with a first pliable surface thereon. The first belt 402 may have an inner tube for the containment of pressurized air.

A second plurality of parallel shafts 414, 414' . . . 414$^n$ are also retained by the first and second walls. The second belt 404 is located on hubs attached to the second plurality of shafts 414, 414' . . . 414$^n$. The second belt 404 has a fixed circumference 415 with a second pliable surface thereon and may also include an inner tube for the containment of pressurized air.

As with length measuring and positive drive apparatus 10, either through the use of spacers 11, 11' . . . 11$^n$, selectively positioning the mounting-bearing means 58 and 62 on the first and second walls or through an adjustable mounting-bearing means 100, at least a portion of the second plurality of shafts 414, 414' . . . 414$^n$ are moved toward each other to bring the first and second pliable surfaces on belts 402 and 404 into engagement along a common plane 416. The depth of the pliable surface required is dependent on the diameter of cable 200 but is always selected to envelope cable 200 as shown in FIG. 8, while maintaining positive contact along the common plane 416.

A guide 140 aligns and centers the cable 200 on common plane 416 and the first and second pliable surfaces on belts 402 and 404. Belts 402 and 404 engage and substantially surround the cable 200 as the cable 200 moves on the plane 416.

An encoder 88 responsive to the rotation of one the shafts in the second plurality of shafts 414, 414' . . . 414$^n$ provides a counter display device 82 with signals proportional to the movement of cable 200 along common plane 416 to provide a linear readout on face 84 of the length of cable 200 that has moved along the plane 416.

As with measuring mechanism 10, it may be necessary to provide the plurality of shafts 412, 412' . . . 412$^n$ and 414, 414' . . . 414$^n$ with torque from an electric motor 300 or some other source power to aid in overcoming frictional drag created by the engagement of pliable surfaces on belts 402 and 404 or to actually pull the cable 200 along the plane 416. Further, the counter display device 82 may at discrete intervals, supply a marker with a signal to activate solenoid in dye container which applies a mark on the cable 200 to verify a predetermined length of cable 200 has moved along the plane 416 or when a cut-off device is in operation a signal to activates a shear to sever the cable 200 after a predetermined length has moved along plane 416.

I claim:

1. A mechanism for measuring a length of a continuously produced product comprising:
    a housing having a first wall and a second wall;
    a first shaft retained by said first and second walls;
    a first rotatable member fixed to said first shaft, said first rotatable member having a first circumferential face, said first circumferential face having a pliable surface and a first fixed length;
    a second shaft retained by said first and second walls;
    a second rotatable member fixed to said second shaft, said second rotatable member having a second circumferential face, said second circumferential face having a pliable surface and a second fixed length;
    means for establishing a fixed distance between said first and second shafts to bring said first and second circumferential faces into engagement to establish a common chord between said first and second rotatable members, said pliable surfaces on said first and second circumferential faces engaging and surrounding said product as the product moves along the entire length of said chord; and
    means responsive to rotation of one of said first and second rotatable member to provide a linear readout of the movement of the product along said chord.

2. The mechanism, as recited in claim 1 wherein said means for establishing said fixed distance between said first and second shafts includes;
    first and second mounting means for selectively positioning said first shaft on said first and second walls to establish the length of said chord.

3. The mechanism, as recited in claim 2 wherein said first and second mounting means are moved in first and second slots on said first and second walls by adjustable screws to establish said fixed distance between said first and second shafts.

4. The mechanism, as recited in claim 2 wherein said first and second mounting means have flanges with openings therein and bolts which extent through said openings into selected openings in said first and second walls, said openings in said first and second walls being located at different distances from said first shaft to allow the distance between said first and second mounting means to be changed to create different lengths for said chord.

5. The mechanism, as recited in claim 1 where said first and second walls are each made of first and second sections, said first shaft being located in said first sections and said second shaft being located in said second sections.

6. The mechanism, as recited in claim 5 further including:
first flanges located on said first and second sections of said first and second walls;
second flanges located on said first and second sections of said first and second walls; and
fastener means for joining said first and second flanges on said first and second walls together to establish said fixed distance between said first and second shafts.

7. The mechanism, as recited in claim 6 further including:
spacer means located between said first and second flanges to change the distance between said first and second shafts and correspondingly the length of said chord.

8. The mechanism, as recited in claim 7 further including:
guide means for aligning said product in a centered and parallel plane with said chord.

9. The mechanism, as recited in claim 1, further including;
means for simultaneously applying torque to said first and second shafts to assist in overcoming drag created between the pliable surface on said first and second circumferential faces on movement of said product along said chord.

10. The mechanism, as recited in claim 8, wherein said product on moving on said chord simultaneously rotates said first and second shafts.

11. The mechanism, as recited in claim 1, further including;
means for simultaneously applying torque to said first and second shafts to move the product along said chord.

12. The mechanism, as recited in claim 1, wherein said means to provide said readout includes:
modifier means for multiplying the rotational output of the shaft to increase the resolution of the readout signal corresponding to the linear movement of the product on said chord.

13. The mechanism as recited in claim 1, wherein said means to provide linear readout includes:
an encoder responsive to rotation of said shaft for generating an output signal;
counter means connected to said encoder for receiving said output signal; and
means for providing a visual indication of the linear movement of said product along said chord.

14. The mechanism as recited in claim 1 wherein each of said first and second rotatable members include;
a tire attached to a hub member; and
a tube located in said tire, said tube being pressurized with air to maintain a radius for said circumferential face, said chord being a function of said radius with the pressure of the air in said tube aiding in creating the pliable surface which substantially surround the production its circumferential face.

15. The mechanism as recited in claim 1 further including:
means connected to said first and second rotatable members for pulling said product along said chord at a predetermined speed.

16. The mechanism as recited in claim 14 further including:
means for providing an indication on said product after a predetermined length of product has moved past a point on said chord.

17. A mechanism for measuring a length of a continuously produced product comprising:
a housing having a first wall and a second wall;
a first plurality of parallel shafts retain by said first and second walls;
a first belt located on hubs attached to said first plurality of shafts, said first belt having a fixed circumference with a first pliable surface thereon;
a second plurality of parallel shafts retained by said first and second walls;
a second belt located on hubs attached to said second plurality of shafts, said second belt having a fixed circumference with a second pliable surface thereon;
means for moving at least a portion of said first and second plurality of shafts toward each other to bring said first and second pliable surfaces into engagement along a common plane;
means for aligning said product on said common plane, said first and second pliable surfaces engaging and substantially surrounding said product as the product moves on said plane; and
means responsive to rotation of one of said first and second plurality of shafts to provide a linear readout of the movement of said product on said common plane.

18. The mechanism as recited in claim 17, further including:
means for simultaneously applying torque to said first and second plurality of shafts to move said product on said common plane and assist in overcoming frictional drag created by the engagement by said pliable surfaces on said first and second belts.

19. The mechanism as recited in claim 17, wherein said means to provide said linear readout includes:
encoder means responsive to rotation of said one shaft to generate discrete signals corresponding to movement of the product on said common plane; and
recorder means responsive to said discrete signals for providing a visual indication of the linear movement of said product.

20. The mechanism as recited in claim 19 further including;
means for marking said product when a predetermine length of product has past a fixed point on said common plane.

* * * * *